United States Patent [19]
Häggblom

[11] 4,110,933
[45] Sep. 5, 1978

[54] PROCESS AND AN APPARATUS FOR KILLING TREES OR WOODY PLANTS

[75] Inventor: Per Häggblom, Uppsala, Sweden

[73] Assignee: Edsbyns Industri AB, Edsbyns, Sweden

[21] Appl. No.: 759,835

[22] Filed: Jan. 17, 1977

[30] Foreign Application Priority Data

Jan. 27, 1976 [SE] Sweden ................................ 7600849

[51] Int. Cl.² .............................................. A01G 7/06
[52] U.S. Cl. ...................................................... 47/57.5
[58] Field of Search .............................. 47/57.5; 21/73

[56] References Cited
U.S. PATENT DOCUMENTS

| | | | |
|---|---|---|---|
| 970,375 | 9/1910 | Hoskins | 47/57.5 UX |
| 2,776,634 | 1/1957 | Morton | 47/57.5 UX |
| 3,069,809 | 12/1962 | Simmons | 47/57.5 |
| 3,280,504 | 10/1966 | Laing | 47/57.5 |
| 3,461,588 | 8/1969 | Johnson | 47/57.5 X |
| 3,691,683 | 9/1972 | Sterzik | 47/57.5 |

FOREIGN PATENT DOCUMENTS

| | | | |
|---|---|---|---|
| 931,138 | 8/1955 | Fed. Rep. of Germany | 47/57.5 |
| 786,083 | 11/1957 | United Kingdom | 47/57.5 |
| 1,274,291 | 5/1972 | United Kingdom | 47/57.5 |

*Primary Examiner*—Robert E. Bagwill
*Attorney, Agent, or Firm*—Burns, Doane, Swecker & Mathis

[57] ABSTRACT

Trees and bushes are killed by means of a biocide. A sharp-pointed carrier for the biocide is inserted between the bark and the wood of the trees or bushes, to make the biocide contact the phloem and the outermost xyleme.

5 Claims, 5 Drawing Figures

PROCESS AND AN APPARATUS FOR KILLING TREES OR WOODY PLANTS

The present invention relates to a process and an apparatus for killing trees or woody plants having bark, primarily trees and bushes, by applying a biocide.

During the last years authorities dealing with environmental problems have been paying a growing interest to the environmental problems resulting from the use of chemical preparations for different purposes, for example for eradicating plants or trees. No satisfactory process for killing for example trees or bushes has been found, and in fact the known art is subject to essential deficits as regards control and distribution of the chemical preparations.

When dealing with eradicating plants of a woody character, for example aspen or other foliiferous vegetation, two principally different procedures have hithertofore been utilized, namely firstly, so-called "pocketing", which means that by using an axe or a similar tool and cutting the fibres a major or minor wound is made in the wood of the plant wherein the chemical preparation is placed and secondly, spreading from air craft. In the former case using the pocketing technique there are disadvantages in that great amounts of the chemical preparation must be applied to provide the desired effect, which results in losses in applying the preparation and also uncontrolled spreading of the preparation after killing the tree. Spreading from aircraft is, of course, subject to pronounced deficits, since, firstly, selectivity is difficult to obtain and, secondly, the possibilities of controlling the distribution of the preparation are quite delimited.

In fact, if suitable technique could be provided, it would be possible by using very small amounts of preparation to provide for the desired killing, namely if the application could be carried out in such a manner as to bring the major part of the preparation to intervene in the biological process.

The main object of the instant invention is thus to provide for a technique whereby the deficiencies of the prior art are avoided and whereby in a simple and controlled manner the biocide can be applied in small amounts.

It has now surprisingly been found that if the chemical preparation, in the present case a biocide in the form of a herbicide, is applied in the area between the bark and the wood of the plant to be killed, precaution being taken that the fibres of the site of application are left intact to the maximum possible extent, a highly effective killing will be obtained while using relatively small amounts of the herbicide. The technique of this invention stands in sharp contrast to the prior art of pocketing and subsequent application of preparation, in that the invention aims at providing minimum damage to the plant at the application site, whereby the distribution of the preparation in the biological transport paths takes place without disturbances.

Although the invention is not to be bound to any particular theory it looks as though the green parts of the plant, i.e., the foliage when dealing with foliiferous trees, are highly sensitive to the small amounts of herbicide which are transported in the so-called phloem and the outermost annual rings. The efficiency seems to be impaired if the fibres in and around the application site are severed, irrespective as to whether such severing takes place in the bank or in the wood.

The present invention is applicable to all types of chemical preparations having the desired herbicidal activity. A preferred compound is trichloropicolinic acid present in the commercially available preparation PICLORAM, which may contain a minor part of 2,4-dichlorophenoxy acetic acid as its amine salt. Other suitable herbicides are trichlorophenoxy acetic acid and dichlorophenoxy acetic acid, which may be used individuallay or in combination and suitably are present in the form of amine or sodium salts. In fact, the technique of this invention provides for such an efficient utilization of the activity of the preparation that such herbicides which previously have been considered to have a too low activity now may be used and provide for satisfactory results.

Among other useful herbicides for applications in accordance with the technique of this invention the following may be mentioned: phenoxy acids, 2,3,6-trichlorobenzoic acid (auxine-type herbicides), Dalapon (dichloropropionic acid, generally plasma destructive poison), maleic hydrazide (disturbs the nucleic acid metabolism) TCA (trichloroacetic acid, generally plasma destroying poison), Diquat (1,1-ethylene-2,2-bipyridyliumdibromide monohydrate, generally plasma destroying poison). Moreover, so-called photosynthesis inhibitors may be used, among which the following may be mentioned: S-triazines, triazinones, uracils, pyridazinones, substituted ureas, acyl anilides, benzonitriles. Finally, kakodylic acid and glyfosate possessing a generally herbicidal activity may be mentioned.

The amount of herbicide which has to be applied with regard to a certain type of plant must, of course, be adapted to the size of the plant and to the type of preparation used. When using the above-mentioned PICLORAM in application on trees, for example aspen, a suitable amount is about 10–30 mg per cm stem diameter, suitably 15–25 mg and particularly about 20 mg.

The invention also relates to an apparatus for carrying out this novel process. This apparatus is essentially characterized by a flat flexible nozzle member or biocide carrier. Said member can be inserted into the area between the bark and wood of the plant by any type of driving device, the apparatus also including a container from which the nozzle member if required can be supplied with herbicide for its application.

The invention will in the following be further described by non-limiting examples, the appended drawing showing diagrammatically two different embodiments of the apparatus according to the invention and the examples illustrating practical applications.

Figure 1:
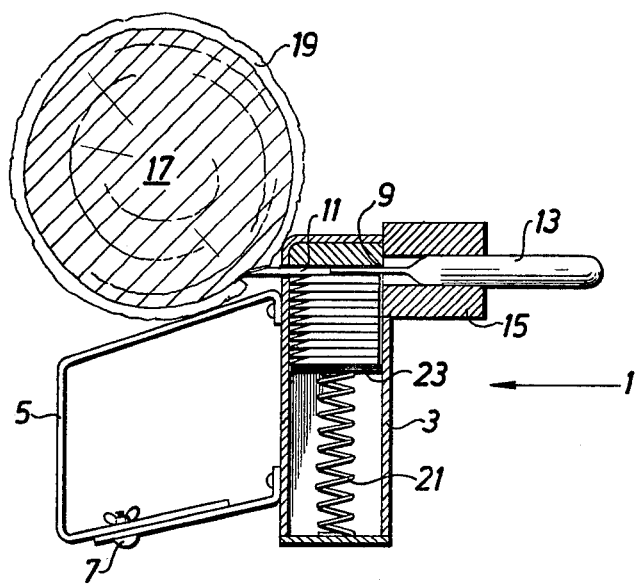
FIG. 1 shows an embodiment containing herbicide carriers intended to be inserted into the area between bark and wood of a plant.

The application apparatus shown in FIG. 1 and generally designated 1 is largely designed as a pistol and includes a magazine 3, containing a spring 21 and a feeding piston 23 actuated by said spring. At the upper end of magazine 3 there is a recess 9 for herbicide carriers 11 which are designed as flat flexible wedges further described below with reference to FIGS. 2 and 3. Opposite to recess 9 of magazine 3 an insertion member 13 is displaceably arranged in a bearing means 15 attached to magazine 3. For holding the application apparatus 1 there is attached to the magazine a loop or handle 5 the upper side of which facing the object to be treated can be adjusted by loosening an adjustment screw 7 movable in a slit (not shown) arranged in the lower part of the loop.

Figure 2:
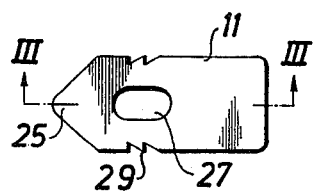
FIGS. 2 and 3 show the carrier proper in natural size in a plan view and a cross sectional side view, respectively.
Figure 3:

The magazine 3 of the application apparatus can be filled up from below with wedges 11 after removal of spring 21 and piston 23, said wedges being shown in detail and in natural size in FIGS. 2 and 3. The wedge 11 consists of a flattened flexible body which, at the front end 25, is tapered width-wise as well as thickness-wise, as is clear from FIG. 2 and FIG. 3, respectively. Wedge 11 contains a centrally positioned recess 27 intended to contain the preparation to be applied into for instance a tree. Several recesses, f.i. in a row, are, of course, conceivable. Moreover, the wedge is provided at both sides thereof with barbs 29, which are there to provide for better fixation of the wedge as applied. Such barbs are, however, not necessary for satisfactory operation. The apparatus described above operates mainly in the following manner.

A set of wedges 11 are filled with a mass of the herbicide in question, for example PICLORAM as described above, in an amount adapted to the size of the plant. Then the magazine 3 is loaded from below with the desired number of wedges. If application is now to be performed on a tree 17 having an annularly enclosing bark 19, the angle of the loop 5 is adjusted by means of the adjustment screw 7 in relation to the diameter of the tree in a suitable member. After withdrawal of the inserting member 13 so that a wedge 11 will be positioned in firing position the application apparatus 1 is now put in a position against the tree 17 as shown in FIG. 1. By means of an axe or a hammer or the like the insertion member 13 will now be struck into recess 9 of magazine 3, a wedge 11 being inserted into the area between the bark and the wood of the tree. By shaping the front end 25 of wedge 11 as is clear from FIG. 3 the wedge may be easily deflected against the harder wood so that it can be smoothly inserted essentially without cutting any fibers. After complete insertion of the wedge it is left in the same position so that the chemical preparation of recess 27 can migrate into the surroundings and be transported both upwardly and downwardly in the tree with the phloem and the xylem to provide the desired effect.

At larger wood diameters it is, of course, suitable to apply two or several wedges evenly distributed around the circumference of the stem at the same level. This results in even distribution of the herbicide and thereby a faster effect.

Figure 4:
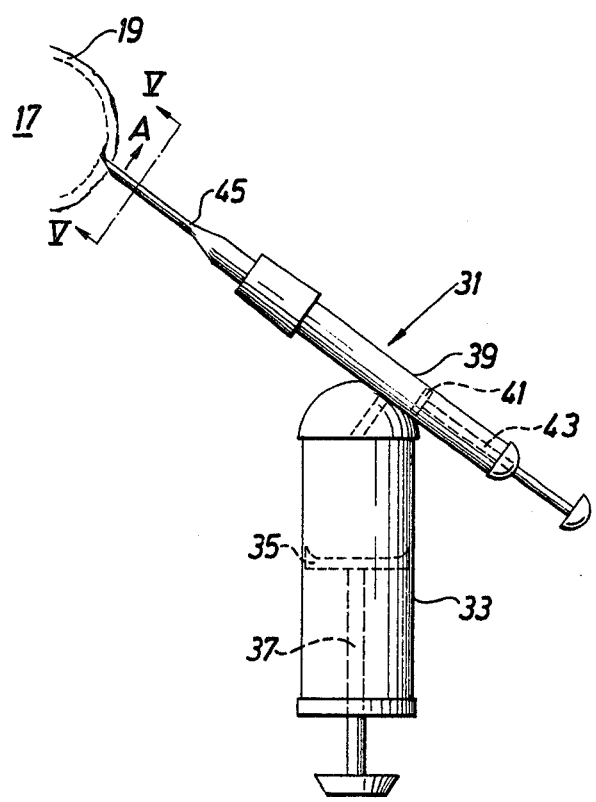
FIG. 4 shows another embodiment of the apparatus according to the invention containing the fixed nozzle member and means for supplying herbicide for application between bark and wood.
Figure 5:
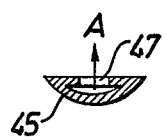
FIG. 5 shows in an enlarged view a cross section of the nozzle member.

The apparatus 31 shown in FIG. 4 is largely a conventional grease gun, such as used for example when lubricating cars. The apparatus is provided with a main container 33 having a piston 35 and a bar 37. At the upper end of the main container a metering cylinder 39 is arranged under an angle in relation to the main container 33 as is clear from FIG. 4. The metering cylinder 39 is in a conventional manner provided with a piston 41 and a bar 43. At the front end of cylinder 39 there is arranged a metering nozzle 45, which is flattened and tapered at the outer end largely in the same manner as wedge 11 according to FIGS. 2 and 3. FIG. 5 shows a cross section along line V—V of FIG. 4 illustrating the shape of the nozzle. Facing the planar side of the nozzle an opening 47 is provided through which the herbicide may be supplied in connection with its application. The function of this apparatus is briefly as follows.

With piston bar 43 in extended position the pointed outer end of the metering nozzle 45 is inserted into the area between bark and wood. This corresponds largely to the striking of a wedge 11 in accordance with FIG. 1. When the nozzle has been inserted to the desired position the piston bar 43 is forced inwardly a distance, whereby herbicide mass is fed into the area between bark and wood in the desired amount. As is clear from FIG. 4 the discharge side of nozzle 45 is facing the phloem, i.e., the bark 19, whereby maximum effect will be obtained. This procedure is now repeated the desired number of times, either several times on the same plant having a large stem diameter or on different plants.

EXAMPLE 1

Application of Herbicide on Aspen Carrying Leaves

PICLORAM was applied at breast level on aspen trees of different sizes by using the technique described above, for example by means of the apparatus of FIG. 1. The herbicide was PICLORAM and was applied in an amount of about 20 mg/cm tree diameter. At greater tree diameters, such as exceeding 7–8 cm, application was performed at two or three positions at the same level on the same tree.

In all cases a noticeable effect was observed within 18 days at the doses stated. As a comparison with conventional technique it can be mentioned that the corresponding amounts of herbicide applied by pocketing did not give the desired result, probably depending on interrupted distribution of the herbicide in the trees and possible leaching by rain. Simply expressed, the herbicide remains in the pocket in view of the fact that the fibres have been cut off.

EXAMPLE 2

Application in Autumn on Aspen Trees not Carrying Leaves

PICLORAM was applied on aspen trees of different sizes in the same manner as in accordance with example 1 but this time in the autumn after the leaves of the aspen trees had fallen. No effect was noticeable in connection with the leaving in the spring, but about 3 weeks after the development of the leaves the same effect as that above could be observed with complete killing as a final result. When applying the same amount of herbicide by pocketing no effect at all could be observed after the development of the leaves the following spring.

What is claimed is:

1. An apparatus for applying a biocide to trees and woody plants having bark comprising:
   discrete injection means for carrying a quantity of biocide for insertion into a tree;
   means for feeding a plurality of said injection means in sequence; and
   means for driving said injection means sequentially into the tree substantially into the area between the bark and the wood of the tree.

2. The apparatus of claim 1, wherein said injection means comprising a biocide carrier including:
   a front end with an edge for penetrating said bark;
   a recess for holding a quantity of biocide; and a plurality of barbs for holding said carrier in said tree.

3. The apparatus of claim 2, wherein said feeding means comprises:

a magazine for holding a plurality of said biocide carriers in position to be fed in sequence to an insertion position;

said magazine having an exit aperture through which said carriers may be inserted into said tree; and having a recess for permitting said drive means access to said magazine.

4. Apparatus for claim 3, wherein said drive means comprises:

bearing means surrounding said recess and having an opening therethrough aligned with said recess; and an insertion member adapted for insertion through said bearing means opening into engagement with one of said carrier means.

5. The apparatus of claim 4, further including a handle affixed to said magazine and adapted for engagement with the trunk of a tree and adjustably operative to align and hold said magazine in a position to facilitate entry of said carrier means into the tree at a desired angle to the surface of the tree.

* * * * *